US012681144B2

(12) United States Patent
Grebner et al.

(10) Patent No.: US 12,681,144 B2
(45) Date of Patent: Jul. 14, 2026

(54) CIRCUITRY AND METHOD

(71) Applicant: Sony Group Corporation, Tokyo (JP)

(72) Inventors: Timo Grebner, Stuttgart (DE);
Christian Waldschmidt, Stuttgart
(DE); Daniel Felipe Ardila Palomino,
Stuttgart (DE)

(73) Assignee: SONY GROUP CORPORATION,
Tokyo (JP)

( * ) Notice: Subject to any disclaimer, the term of this
patent is extended or adjusted under 35
U.S.C. 154(b) by 447 days.

(21) Appl. No.: 17/960,853

(22) Filed: Oct. 6, 2022

(65) Prior Publication Data

US 2023/0119187 A1      Apr. 20, 2023

(30) Foreign Application Priority Data

Oct. 14, 2021    (EP) ..................................... 21202652

(51) Int. Cl.
  *G01S 7/40*       (2006.01)
  *G01S 13/52*      (2006.01)
  *G01S 13/60*      (2006.01)
(52) U.S. Cl.
  CPC .............. *G01S 7/403* (2021.05); *G01S 13/52*
  (2013.01); *G01S 13/60* (2013.01)
(58) Field of Classification Search
  CPC ........... G01S 7/403; G01S 13/52; G01S 13/60
  (Continued)

(56) References Cited

U.S. PATENT DOCUMENTS

2016/0356882 A1    12/2016  Glas et al.
2018/0356517 A1*   12/2018  Cieslar ................... G01S 13/42
              (Continued)

FOREIGN PATENT DOCUMENTS

CN        110687521  A      1/2020
CN        112362055  A      2/2021
CN        112578355  A      3/2021
DE     102019211327 A1 *    2/2021  ............. G01S 7/403

OTHER PUBLICATIONS

Gao et al. "MIMO-SAR: A Hierarchical High-resolution Imaging
Algorithm for mmWave FMCW Radar in Autonomous Driving,"
arXiv:2101.09293v2 [eess.SP] Jun. 4, 2021 (Year: 2021).*
                (Continued)

*Primary Examiner* — Samarina Makhdoom
(74) *Attorney, Agent, or Firm* — XSENSUS LLP

(57)            ABSTRACT
The present disclosure provides a circuitry for estimating a
mounting angle of a radar sensor with respect to a mobile
platform coordinate system. The circuitry is configured to
estimate a first velocity of a first radar sensor, based on first
radar detection data obtained from the first radar sensor,
wherein the first radar detection data is indicative of at least
two targets; estimate a second velocity of a second radar
sensor, based on second radar detection data obtained from
the second radar sensor, wherein the second radar detection
data is indicative of at least two targets, and estimate the
mounting angle of the first radar sensor, based on the
estimated first velocity, the estimated second velocity, a
predefined first mounting position of the first radar sensor
with respect to the mobile platform coordinate system and a
predefined second mounting position of the second radar
sensor with respect to the mobile platform coordinate sys-
tem.

20 Claims, 5 Drawing Sheets

(58) Field of Classification Search
USPC ........................................................ 342/173
See application file for complete search history.

(56) References Cited

U.S. PATENT DOCUMENTS

| | | | | |
|---|---|---|---|---|
| 2019/0025405 | A1* | 1/2019 | Liu | G01S 7/4026 |
| 2019/0187250 | A1* | 6/2019 | Ru | G01S 7/4052 |
| 2020/0003886 | A1* | 1/2020 | Cho | G01S 13/60 |
| 2020/0033445 | A1* | 1/2020 | Raphaeli | H01Q 1/38 |
| 2020/0150677 | A1 | 5/2020 | Walters et al. | |
| 2020/0309937 | A1* | 10/2020 | Buddendick | G01S 7/4026 |
| 2021/0165074 | A1* | 6/2021 | Brosche | G01S 13/589 |

OTHER PUBLICATIONS

Schöller et al., "Targetless Rotational Auto-Calibration of Radar and Camera for Intelligent Transportation Systems", 2019 IEEE Intelligent Transportation Systems Conference (ITSC), Apr. 2019, 8 pages.

Kellner et al., "Instantaneous Ego-Motion Estimation Using Multiple Doppler Radars,", 2014 IEEE International Conference on Robotics & Automation (ICRA), May 31-Jun. 7, 2014, pp. 1592-1597.

Kellner et al., "Joint Radar Alignment and Odometry Calibration," 18th International Conference on Information Fusion, Jul. 6-9, 2015, pp. 366-374.

Izquierdo et al., "Multi-Radar Self-Calibration Method using High-Definition Digital Maps for Autonomous Driving," 2018 21st International Conference on Intelligent Transportation Systems (ITSC), Nov. 4-7, 2018, pp. 2197-2202.

Aggarwal et al., "Estimating Sensor Orientation in Cameras," Proceedings 15th International Conference on Pattern Recognition, IEEE, 2000, pp. 896-899.

Kram et al., "Automated Radar Mount-Angle Calibration in Automotive Applications," 2019 IEEE Radar Conference (RadarConf), 2019, 5 pages.

* cited by examiner

CIRCUITRY AND METHOD

CROSS-REFERENCE TO RELATED APPLICATION

The present application claims priority to European Patent Application No. 21202652.0, filed Oct. 14, 2021, the entire contents of which are incorporated herein by reference.

TECHNICAL FIELD

The present disclosure generally pertains to a circuitry and a method, and more particularly, to a circuitry and a method for estimating a mounting angle of a radar sensor with respect to a mobile platform coordinate system.

TECHNICAL BACKGROUND

Generally, it is known to provide radar sensors in a mobile platform.

Based on radar sensor detection data obtained from radar sensors of a mobile platform, an environment of the mobile platform can be sensed and an ego-motion of the mobile platform can be estimated.

It is also known to obtain calibration information of a radar sensor provided in a mobile platform.

Although there exist techniques for obtaining calibration information of a radar sensor provided in a mobile platform, it is generally desirable to improve a technique for obtaining calibration information of a radar sensor provided in a mobile platform.

SUMMARY

According to a first aspect, the disclosure provides a circuitry for estimating a mounting angle of a radar sensor with respect to a mobile platform coordinate system, the circuitry being configured to estimate a first velocity of a first radar sensor, based on first radar detection data obtained from the first radar sensor, the first radar detection data being indicative of at least two targets; estimate a second velocity of a second radar sensor, based on second radar detection data obtained from the second radar sensor, the second radar detection data being indicative of at least two targets, and estimate the mounting angle of the first radar sensor, based on the estimated first velocity, the estimated second velocity, a predefined first mounting position of the first radar sensor with respect to the mobile platform coordinate system and a predefined second mounting position of the second radar sensor with respect to the mobile platform coordinate system.

According to a second aspect, the disclosure provides a method for estimating a mounting angle of a radar sensor with respect to a mobile platform coordinate system, the method comprising estimating a first velocity of a first radar sensor, based on first radar detection data obtained from the first radar sensor, the first radar detection data being indicative of at least two targets; estimating a second velocity of a second radar sensor, based on second radar detection data obtained from the second radar sensor, the second radar detection data being indicative of at least two targets, and estimating the mounting angle of the first radar sensor, based on the estimated first velocity, the estimated second velocity, a predefined first mounting position of the first radar sensor with respect to the mobile platform coordinate system and a predefined second mounting position of the second radar sensor with respect to the mobile platform coordinate system.

Further aspects are set forth in the dependent claims, the drawings and the following description.

BRIEF DESCRIPTION OF THE DRAWINGS

Embodiments are explained by way of example with respect to the accompanying drawings, in which.

DETAILED DESCRIPTION OF EMBODIMENTS

Figure 1:
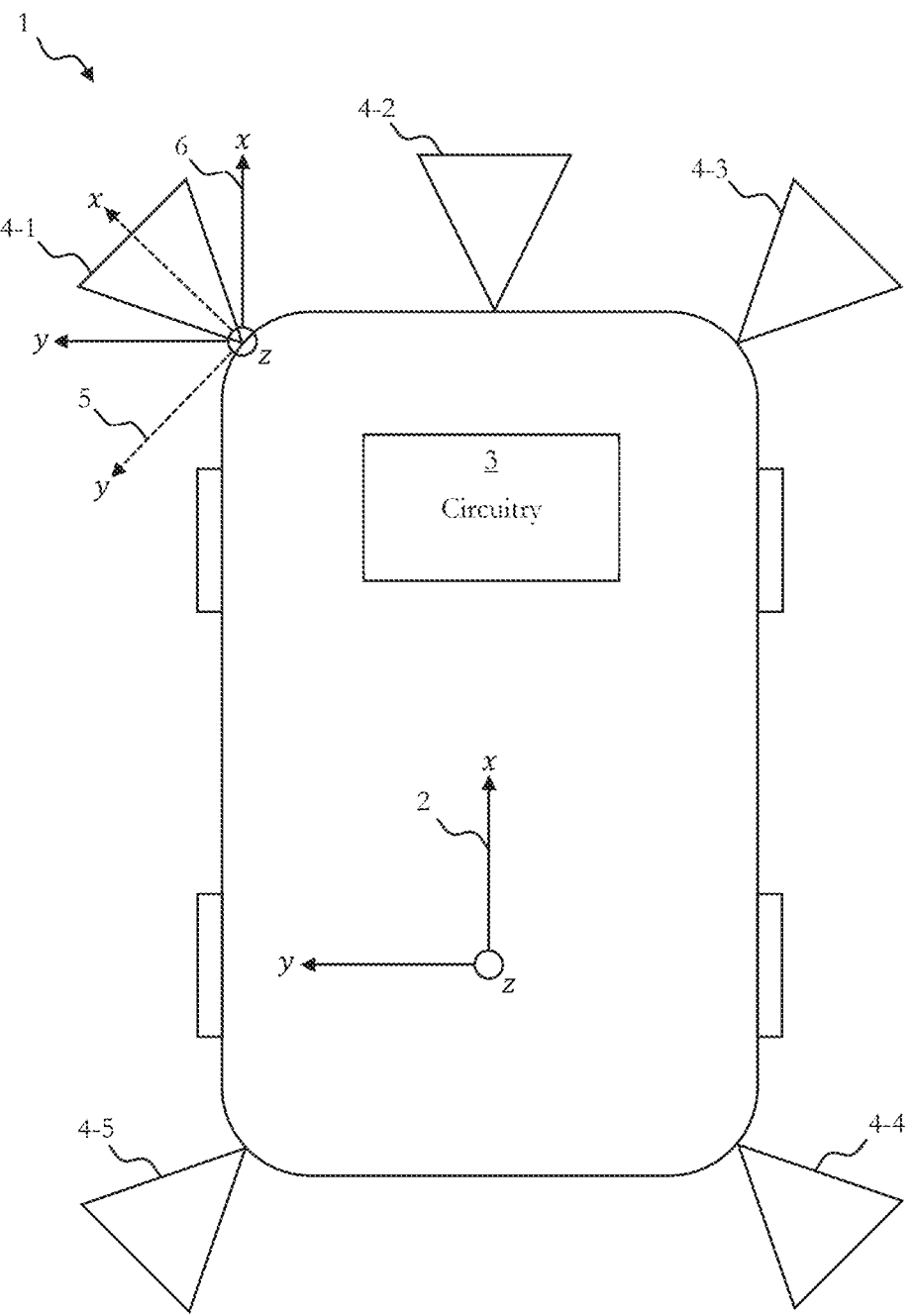
FIG. 1 is a block diagram illustrating a vehicle with radar sensors and a circuitry according to an embodiment of the present disclosure.

Before a detailed description of the embodiments under reference of FIG. 1 is given, general explanations are made.

As discussed in the outset, it is generally known to provide radar sensors in a mobile platform, for example as a network of radar sensors.

Based on radar sensor detection data obtained from radar sensors of a mobile platform, an environment of the mobile platform can be sensed and an ego-motion of the mobile platform can be estimated.

Autonomous driving, navigation and/or driver assistance systems may be based on the estimated ego-motion of the mobile platform.

It is also known to obtain calibration information of a radar sensor provided in a mobile platform.

The calibration information may include mounting orientation information of the radar sensors. The mounting orientation information may indicate a yaw angle of the radar sensors.

In some embodiments, a yaw angle of the radar sensors may have to be determined with a higher precision than a pitch angle or a roll angle of the radar sensors because an assumption that the mobile platform and other objects are moving on the ground may allow a higher tolerance for the pitch angle and the roll angle. Thus, some embodiments of the present disclosure pertain to estimating a yaw angle of the radar sensors while ignoring tolerances of a pitch angle or a roll angle of the radar sensors.

In some embodiments of applications of autonomous chides, the calibration information of the sensors is critical since it is required for transforming the radar detection data measured by individual sensors of an autonomous vehicle to a common reference frame, for example the mobile platform coordinate system.

Transforming the radar detection data from individual sensors of a mobile platform to a common reference frame may enable to implement higher level algorithms such as sensor fusion or robustness enhancements through sensor redundancy.

For estimation tasks in a self-driving vehicle's context, precise calibration information may be necessary. For example, the mounting orientation information may be critical since a small error of a value indicating a mounting angle of a radar sensor may have a big impact in the full signal processing chain in some embodiments.

Traditionally, in some embodiments, radar sensors can be calibrated in controlled environments once they are installed on the mobile platform by using specialized equipment. These procedures may be expensive and time consuming. In addition, these calibration approaches may require that the radar sensors are re-calibrated in case the mounting orientation changes due to deformation of the chassis of the mobile platform, for example due to accidents or thermal expansion.

Some better alternatives may allow more flexible calibration procedure.

A possible approach may be determining the orientation based on ego-motion estimation and available inertial measurement unit (IMU) data. In some embodiments, the IMU can determine a yaw rate of the mobile platform very precisely, but must be installed in the mobile platform in addition to the radar sensors. A comparison between the ego-motion estimation based on radar detection data from the radar sensors and the ego-motion estimation based on the IMU data may enable an accurate orientation estimation of a radar sensor in relation to a coordinate system of the mobile platform. The application of this method may be possible as soon as at least one radar sensor and one yaw rate sensor are mounted on a mobile platform and the position of the radar sensor in relation to the mobile platform coordinate system is known. In some embodiments, a disadvantage of this approach is the need of an additional sensor, for example an IMU, able to measure the yaw rate of the mobile platform. Providing an additional sensor may increase the costs of a system and, depending on characteristics of the IMU sensor, it may lead to inaccuracies if the IMU is not reliable.

Another possibility may be orientation estimation of radar sensors based on high accuracy maps, wherein targets may be entered into maps based on radar detections and may be used directly for self-calibration. A basis of such an algorithm may be subsequent matching of targets from different radar sensors. The orientation estimation may be based on selected landmarks which have a high quality and have been detected by several sensors. Following the same principle, similar approaches may be used as long as multiple radar sensors detect the same targets from different directions. In some embodiments, a disadvantage of these approaches is that they rely on detecting high quality landmarks that can be identified by multiple radars and can be associated between different radar sensors. In some embodiments, presence of quality landmarks cannot be always guaranteed, and even if such landmarks exist, matching the detected landmarks between different sensors may be a challenging task.

Other existing possibilities are offline and extrinsic and, thus, cannot be performed online in some instances. For example, radar sensors may be calibrated by means of additional sensors directly during installation. For this purpose, a camera may be used, which may have to be calibrated first. Different radar and camera systems may be used. However, these may lead to a considerable additional expenditure of time.

In view of the above, accordingly, some embodiments of the present disclosure provide a robust calibration approach to calculate a yaw angle of a mounting orientation of a radar sensor or network of radar sensors, for example incoherent radar sensors, for automotive applications, for example in a mobile platform, without the need of installing additional sensors (such as IMUs) or additional calibration equipment.

In some embodiments, it is possible to perform the mounting orientation (e.g. yaw angle) calibration online, meaning that it is possible to calibrate a mounting orientation of radar sensors of a mobile platform in the road while the mobile platform is driving. This may be a major advantage compared to more traditional approaches where a calibration procedure was needed in a controlled environment and calibration equipment needed to be used.

Some embodiments also allow to monitor the mounting orientation (e.g. the yaw angle) of radar sensors of a mobile platform over rime to detect if the mounting orientation changes due to deformation of the chassis of the mobile platform, for example because of an accident or thermal expansion. For example, on a hot day, the chassis of the mobile platform may be deformed by a few millimeters, which may have a large impact on the mounting orientation of radar sensors. Thus, in some embodiments of an algorithm in accordance with the present disclosure, it may be possible to keep radar sensors of a mobile platform calibrated during long periods of time.

Some embodiments provide an algorithm for calibrating the mounting orientation (e.g. yaw angle) of each radar sensor in a network of radar sensors. The algorithm may allow online and continuous estimation of the mounting orientation of the radar sensors while driving without the need of any additional sensors like IMUs or cameras. Here, continuous means that the mounting orientation of the radar sensors may be estimated time frame by time frame, wherein radar sensing may be performed every 100 milliseconds, for example.

In some embodiments, overlapping fields of view for the radar sensors or identifying landmarks in a scene is not required, in opposite to some existing techniques, because a different principle for angle calculation may be used which does not require matching detections between the radar sensors or marching detections with pre-defined maps.

In some embodiments, it is unnecessary to go through time consuming and expensive calibration procedures for calculating mounting angles of radar sensors during installation of the radar sensors. Some embodiments are based on ego-motion calibration of a mobile platform, avoiding radar-to-radar registration and enabling calibration on the road, so that calibration in a controlled environment is not required.

Consequently, some embodiments of the present disclosure pertain to a circuitry for estimating a mounting angle of a radar sensor with respect to a mobile platform coordinate system configured to estimate a first velocity of a first radar sensor, based on first radar detection data obtained from the first radar sensor, wherein the first radar detection data are indicative of at least two targets; estimate a second velocity of a second radar sensor, based on second radar detection data obtained from the second radar sensor, wherein the second radar detection data are indicative of at least two targets, and estimate the mounting angle of the first radar sensor, based on the estimated First velocity, the estimated second velocity, a predefined first mounting position of the first radar sensor with respect to the mobile platform coordinate system and a predefined second mounting position of the second radar sensor with respect to the mobile platform coordinate system.

The circuitry may include an entity capable of performing estimation calculations. For example, the circuit may include a central processing unit (CPU), a graphics processing unit (GPU), a field-programmable gate array (FPGA) and/or an application-specific integrated circuit (ASIC).

The radar sensor may belong to a network of radar sensors. The radar sensor (or the radar sensors of the network of radar sensors) may be mounted on a mobile platform to which the mobile platform coordinate system corresponds. The mobile platform coordinate system may be the rest frame of the mobile platform.

The mobile platform may be any platform that can be moved, for example a vehicle. Examples of a mobile platform include a car, a truck, an autonomous vehicle, a train, an Autonomous Mobile Robot (AMR), a tractor, an excavator, a bicycle, a motorcycle, a trike, a people mover, a watercraft, an airborne vehicle, a tracked vehicle, or the like.

The radar sensor may be mounted on the mobile platform with a mounting orientation. The mounting orientation may include a mounting angle, for example a yaw angle. The yaw angle may be an azimuth angle, i.e. an angle in the horizontal plane, of the radar sensor in the mobile platform coordinate system.

The first radar sensor and the second radar sensor may be mounted on the mobile platform with different mounting orientations, e.g. with different yaw angles, and may belong to a network of radar sensors.

The first radar sensor and the second radar sensor may be configured to perform radar detection and output the result of the radar detection as first radar detection data and second radar detection data, respectively.

The radar detection may include emitting radar waves and measuring reflections of the emitted radar waves from targets. The targets may be any objects in the environment of the radar sensors. The targets may include, for example, other vehicles (driving or parking), road signs, trees, buildings, pedestrians, animals, etc.

The first radar detection data and the second radar detection data may be indicative of the targets detected by the radar detection. The first radar detection data and the second radar detection data may indicate the same targets or may indicate different targets. The first radar detection data and the second radar detection data ray indicate two or more targets.

A velocity of the at least two targets indicted by the first radar detection data or by the second radar detection data may be known or assumed. For example, the estimation of the first velocity of the first radar sensor and the estimation of the second velocity of the second radar sensor may be based on the assumption that the at least two targets indicated by the first radar detection data or by the second radar detection data, respectively, are stationary targets, i.e. that the at least two targets indicated by the first radar detection data or by the second radar detection data, respectively, do not move with respect to a road on which the mobile platform is driving or an environment of the mobile platform.

The first velocity of the first radar sensor may be a velocity of the first radar sensor relative to one or a group of targets indicated by the first radar detection data. For example, if the targets indicated by the first radar detection data are (assumed to be) stationary targets, the first velocity of the first radar sensor may be a velocity of the first radar sensor relative to the road on which the mobile platform is driving or the environment of the mobile platform in which the mobile platform is moving.

Likewise, the second velocity of the second radar sensor may be a velocity of the second radar sensor relative to one or a group of targets indicated by the second radar detection data. For example, if the targets indicated by the second radar detection data are (assumed to be) stationary targets, the second velocity of the second radar sensor may be a velocity of the second radar sensor relative to the road on which the mobile platform is driving or the environment of the mobile platform in which the mobile platform is moving.

The mobile platform and/or the network of radar sensors may include more than two radar sensors, which may all be configured as described above and velocities of which may be estimated as described above, each based on at least two targets indicated by radar detection data obtained from the respective radar sensor.

The estimation of the first velocity of the first radar sensor may be based on a linear equation system that establishes a relation between the first velocity of the first radar sensor and relative velocities of the at least two targets indicated by the first radar detection data.

The estimation of the second velocity of the second radar sensor may be based on a linear equation system that establishes a relation between the second velocity of the second radar sensor and relative velocities of the at least two targets indicated by the second radar detection data.

The estimation of the first velocity of the first radar sensor and the estimation of the second velocity of the second radar sensor may be based on a least-squares algorithm or on robust regression.

The estimation of the first velocity of the first radar sensor and the estimation of the second velocity of the second radar sensor may be based on Random Sample Consensus (RANSAC) regression to account for measurement noise and outliers in the first radar detection data and in the second radar detection data.

In some embodiments, the estimation of the first velocity of the first radar sensor is only possible if the first radar detection data are indicative of at least two targets. Likewise, in some embodiments, the estimation of the second velocity of the second radar sensor is only possible if the second radar detection data are indicative of at least two targets.

In embodiments in which the mobile platform and/or the network of radar sensors includes more than two radar sensors from which radar detection data can be obtained, the velocities of the additional radar sensors may be estimated based on the radar detection data obtained from the respective additional radar sensor in a similar way as the first velocity of the first radar sensor and the second velocity of the second radar sensor.

The estimation of the mounting angle of the first radar sensor may include solving an equation system that establishes a relation between the mounting angle of the first radar sensor, the estimated first velocity of the first radar sensor, the estimated second velocity of the second radar sensor, a predefined first mounting position of the first radar sensor with respect to the mobile platform coordinate system and a predefined second mounting position of the second radar sensor with respect to the mobile platform coordinate system.

The predefined first mounting position of the first radar sensor may indicate a coordinate in the mobile platform coordinate system at which the first radar sensor is mounted on the mobile platform. Likewise, the predefined second mounting position of the second radar sensor may indicate a coordinate in the mobile platform coordinate system at which the second radar sensor is mounted on the mobile platform.

The predefined first mounting position and the predefined second mounting position may be stored in a memory and may be read from the memory when the estimation of the mounting angle of the first radar sensor is performed. For example, the predefined first mounting position and the predefined second mounting position may be written to the memory when the mobile platform is manufactured and/or when the first radar sensor or the second radar sensor, respectively, are mounted on the mobile platform.

If the mobile platform and/or the network of radar sensors includes more than two sensors and velocities of the additional sensors are estimated as described above, the equation system for estimating the mounting angle of the first radar sensor may further depend on the estimated velocities of the additional sensors.

The equation system for estimating the mounting angle of the first radar sensor may be non-linear and may be solved using numerical methods such as the Gauss-Newton algorithm or the Levenberg-Marquardt algorithm.

In some embodiments, the first radar detection data indicate a radial velocity and an azimuth angle of each of the at least two targets with respect to the first radar sensor, and the second radar detection data indicate a radial velocity and an azimuth angle of each of the at least two targets with respect to the second radar sensor.

The radial velocity of a target may be a speed of the target with respect to a radar sensor, i.e. a rate at which a distance between the target and the radar sensor changes.

The azimuth angle of a target may be an angle in a horizontal plane of a coordinate system of a radar sensor at which angle the target is located in the coordinate system of the radar sensor.

For example, the radar sensor may detect the target move with a speed corresponding to the radial velocity of the target in a direction corresponding to the azimuth angle of the target.

The radial velocity of the azimuth angle of the at least two targets indicated by the first radar detection data may be used for estimating the first velocity of the first radar sensor. For example, a linear equation system for estimating the first velocity of the first radar sensor may include an equation for each target indicated by the first radar detection data, wherein the equation may include the radial velocity of the target as constant term, trigonometric functions of the azimuth angle of the target as coefficients and velocity components of the first velocity of the first radar sensor as unknowns.

The radial velocity of the azimuth angle of the at least two targets indicated by the second radar detection data may be used for estimating the second velocity of the second radar sensor. For example, a linear equation system for estimating the second velocity of the second radar sensor may include an equation for each target indicated by the second radar detection data, wherein the equation may include the radial velocity of the target as constant term, trigonometric functions of no the azimuth angle of the target as coefficients and velocity components of the second velocity of the second radar sensor as unknowns.

The radial velocity of the target and/or the azimuth angle of the target may be detected based on Doppler radar sensing, for example.

If the mobile platform and/or the network of radar sensors includes more than two radar sensors, radar detection data obtained from the additional radar sensors may indicate a radial velocity and an azimuth angle of targets detected by the additional radar sensors with respect to the respective additional radar sensor.

In some embodiments, the estimating of the mounting angle of the first radar sensor includes estimating, based on the estimated first velocity, the estimated second velocity, the predefined first mounting position and the predefined second mounting position, a longitudinal velocity of the mobile platform coordinate system and a yaw rate of the mobile platform coordinate system.

The longitudinal velocity of the mobile platform coordinate system may be a velocity of the mobile platform with respect to the road on which the mobile platform is driving or to the environment of the mobile platform in which the mobile platform is moving.

The yaw rate of the mobile platform coordinate system may be a rate at which the mobile platform is turning in a horizontal plane of the mobile platform coordinate system with respect to the road on which the mobile platform is driving or to the environment of the mobile platform in which the mobile platform is moving.

If the origin of the mobile platform coordinate system is located at the center of a rear axis of the mobile platform and the Ackermann condition is assumed, i.e. there is no side slip at the rear axis of the mobile platform, a lateral velocity of the mobile platform coordinate system may vanish (equal 0) and need nor be accounted for in an equation system for estimating the mounting angle of the first radar sensor.

However, in general, the Ackermann condition may not be assumed, in which case the estimation of the mounting angle of the first radar sensor may further be based on at least a velocity of a third radar sensor, which may be estimated in a similar way to the first velocity of the first radar sensor and the second velocity of the second radar sensor.

The longitudinal velocity of the mobile platform coordinate system, the yaw rate of the mobile platform coordinate system and the (vanishing) lateral velocity of the mobile platform coordinate system may represent an ego-motion of the mobile platform coordinate system, i.e. an ego-motion of the mobile platform with respect to the road on which the mobile platform is driving or to the environment of the mobile platform in which the mobile platform is moving.

Therefore, the estimation of the mounting angle of the first radar sensor may include estimating an ego-motion of the mobile platform coordinate system.

In some embodiments, the estimating of the first velocity is based on a previously estimated first velocity used as prior.

The prior may be set as initial value for the first velocity in estimating the first velocity of the first radar sensor.

The previously estimated first velocity that is used as prior may be a velocity of the first radar sensor that has been estimated based on previous radar detection data obtained from the first radar sensor before the first radar detection data. For example, the previously estimated first velocity that is used as prior may have been estimated based on previous radar detection data that have been obtained from the first radar sensor 100 milliseconds before the first radar detection data, without limiting the scope of the present disclosure.

Using a previously estimated first velocity of the first radar sensor as prior for estimating the first velocity of the first radar sensor may improve stability over time of the estimation.

Using a previously estimated first velocity of the first radar sensor as prior for estimating the first velocity of the first radar sensor may accelerate the estimation of the first velocity of the first radar sensor by facilitating a faster convergence of the estimation.

Accordingly, a previously estimated velocity of the second radar sensor or any additional radar sensor of the mobile platform and/or network of radar sensors may be used as prior for estimating the second velocity of the second radar sensor or a velocity of any additional radar sensor, respectively.

In some embodiments, the circuitry is further configured to filter the estimated mounting angle of the first radar sensor based on a Kalman filter for reducing noise of the estimated mounting angle of the first radar sensor.

Filtering the estimated mounting angle of the first radar sensor based on a Kalman filter may be based on the assumption that the mounting angle of the first radar sensor typically does not change over time.

Likewise, if the estimation of the mounting angle of the first radar sensor includes estimating an ego-motion of the mobile platform coordinate system, for example the longitudinal velocity and/or the yaw rate of the mobile platform coordinate system, a Kalman filter may also be applied to the ego-motion, for example the longitudinal velocity and/or the yaw rate, of the mobile platform coordinate system.

In some embodiments, the at least two targets indicated by the first radar detection data and the at least two targets indicated by the second radar detection data each represent stationary targets.

Stationary targets may be targets that do not move with respect to the road on which the mobile platform is driving and/or the environment of the mobile platform in which the mobile platform is moving. Examples of stationary targets may include parking vehicles, road signs, trees, buildings and standing or sitting pedestrians or animals or the like.

In some embodiments, the first radar detection data are further indicative of a moving target, and the circuitry is further configured to distinguish the moving target from the stationary targets based on a statistical analysis of the first radar detection data.

The first radar detection data may also be indicative of more than one moving target, and the circuitry may be configured to distinguish the moving targets from the stationary targets based on a statistical analysis of the first radar detection data.

A moving target may be any target that is moving with respect to the road on which the mobile platform is driving and/or the environment of the mobile platform in which the mobile platform is moving. Examples of moving targets may include other (driving) vehicles, cyclists, walking pedestrians and walking or flying animals.

For example, the moving targets may be distinguished from the stationary targets based on the assumption that the stationary targets form a biggest group following a consistent velocity profile in the first radar detection data. The moving targets may also be distinguished from the stationary targets based on the assumption that the velocity profile of the stationary targets is consistent across the first radar detection data, the second radar detection data and any radar detection data obtained from any additional radar sensor.

The distinction between the moving target and the stationary targets may be included in the RANSAC regression for estimating the first velocity of the first radar sensor, or may be implemented separately.

For example, any moving target identified in the first radar detection data may be ignored, and the estimation of the first velocity of the first radar detection data may be based solely on the stationary targets indicated by the first radar detection data.

Likewise, the second radar detection data obtained from the second radar sensor or any radar detection data obtained from any additional radar sensor, respectively, may be indicative of one or more moving targets in addition to at least to stationary targets, and the moving targets may be distinguished from the stationary targets as described with respect to the first radar detection data.

In some embodiments, the estimating of the first velocity is based on a Random Sample Consensus (RANSAC) algorithm.

Likewise, the estimating of the second velocity of the second radar sensor or a velocity of any additional radar sensor, respectively, may be based on a RANSAC algorithm.

Estimating a velocity of a radar sensor based on a RANSAC algorithm may increase a robustness of the estimation with respect to measurement noise and/or outliers.

In some embodiments, the estimating of the mounting angle of the first radar sensor is based on a non-linear least squares algorithm. Examples of non-linear least squares algorithms include the Gauss-Newton algorithm and the Levenberg-Marquardt algorithm.

Estimating the mounting angle of the first radar sensor based on a non-linear least squares algorithm may increase a robustness of the estimation with respect to measurement noise and/or outliers.

In some embodiments, the first radar sensor and the second radar sensor include Multiple Input Multiple Output (MIMO) Doppler radar sensors.

Likewise, if the mobile platform and/or network of radar sensors includes any additional radar sensors, such additional radar sensors may also include MIMO Doppler radar sensors.

The first radar sensor, the second radar sensor and/or any additional radar sensor may include a Time Division Multiplexing (TDM) MIMO radar sensor, a Binary Phase Multiplexing (BPM) MIMO radar sensor, a Frequency Division Multiplexing (FDM) MIMO radar sensor, a Code Division Multiplexing (CDM) MIMO radar sensor, or a radar sensor based on any arbitrary multiplexing strategy.

However, the present disclosure is not limited to MIMO Doppler radar sensors. Any radar sensor or combination of radar sensors suitable for obtaining a radial velocity and an azimuth angle of at least two targets with respect to the radar sensor or combination of radar sensors may be used as the first radar sensor, the second radar sensor and/or any additional radar sensor. For example, in some embodiments, the first radar sensor, the second radar sensor and/or any additional radar sensor may include a single antenna rotating radar sensor or the like.

In some embodiments, the mounting angle of the first radar sensor represents a yaw angle of the first radar sensor.

The yaw angle may indicate an orientation of the first radar sensor in a horizontal plane of the mobile platform coordinate system.

In some embodiments, the estimating of the mounting angle of the first radar sensor includes estimating a mounting angle of the second radar sensor with respect to the mobile platform coordinate system, based on the estimated first velocity, the estimated second velocity, the predefined first mounting position and the predefined second mounting position.

Likewise, the estimating of the mounting angle of the first radar sensor may include estimating a mounting angle of any additional radar sensor of the mobile platform and/or network of radar sensors with respect to the mobile platform coordinate system, based on the estimated first velocity, the estimated second velocity, the predefined first mounting position and the predefined second mounting position.

The mounting angle of the second radar sensor and of any additional radar sensor may represent a yaw angle, i.e. an orientation of the second radar sensor or any additional radar sensor, respectively, with respect to the mobile platform coordinate system.

In general, the estimating of the mounting angle of the first radar sensor ma) be based on an equation system that contains the mounting angle of the first radar sensor, the mounting angle of the second radar sensor, a mounting angle of any additional radar sensor, the longitudinal velocity of the mobile platform coordinate system and the yaw rate of the mobile platform coordinate system as unknowns, and that yields, upon being solved, for example using a non-linear least squares algorithm, estimated values for all these unknowns.

The estimated values for any of these unknowns may be filtered based on a Kalman filter to reduce noise of the estimated values.

In some embodiments, a method for estimating a mounting angle of a radar sensor with respect to a mobile platform coordinate system includes estimating a first velocity of a first radar sensor, based on first radar detection data obtained from the first radar sensor, wherein the first radar detection data is indicative of at least two targets; estimating a second velocity of a second radar sensor, based on second radar detection data obtained from the second radar sensor, wherein the second radar detection data is indicative of at least two targets, and estimating the mounting angle of the first radar sensor, based on the estimated first velocity, the estimated second velocity, a predefined first mounting position of the first radar sensor with respect to the mobile platform coordinate system and a predefined second mounting position of the second radar sensor with respect to the mobile platform coordinate system.

The method may be configured as described above for the circuitry and, in some embodiments, each feature which is configured by the circuitry is a feature of the method, such that all explications made for the circuitry fully apply to the method.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 1, there is illustrated, in a block diagram, a vehicle 1, which is an example of a mobile platform.

The vehicle 1 has a vehicle coordinate system 2, which is an example of a mobile platform coordinate system, and which corresponds to a rest frame of the vehicle 1, without limiting the scope of the present disclosure. An x-axis of the vehicle coordinate system 2 points in a longitudinal driving direction of the vehicle 1, a y-axis of the vehicle coordinate system 2 points to a left side of the vehicle 1 and a z-axis of the vehicle coordinate system 2 points upwards. The origin of the vehicle coordinate system 2 is located at the center of a rear axis of the vehicle 1.

The vehicle 1 includes a circuitry 3 and radar sensors 4-1, 4-2, 4-3, 4-4 and 4-5.

The radar sensors 4-1, 4-2, 4-3, 4-4 and 4-5 will be referred to as radar sensors 4 in the following. The radar sensors 4 include Multiple Input Multiple Output (MIMO) Doppler radar sensors and form a network of radar sensors.

Each of the radar sensors 4 has a sensor coordinate system 5, as illustrated for the radar sensor 4-1 with dashed lines. The sensor coordinate system 5 corresponds to a rest frame of the respective radar sensor 4. An x-axis of the sensor coordinate system 5 points in a central direction of a field of view of the respective radar sensor 4. A y-axis of the sensor coordinate system 5 points to a left direction with respect to the x-axis of the sensor coordinate system 5. A z-axis of the sensor coordinate system 5 points upwards and, thus, is parallel to the z-axis of the vehicle coordinate system. The origin of the sensor coordinate system 5 is located at a mounting position of the respective radar sensor 4, i.e. a position of the vehicle 1 at which the respective radar sensor 4 is mounted.

Each of the radar sensors 4 further has an aligned coordinate system 6, as illustrated for the radar sensor 4-1 with solid lines. The aligned coordinate system 6 also corresponds to a rest frame of the respective radar sensor 4, but is rotated with respect to the sensor coordinate system 5 to match an orientation of the vehicle coordinate system 2. Accordingly, an x-axis of the aligned coordinate system 6 is parallel to the x-axis of the vehicle coordinate system 2 and, thus, points in a longitudinal driving direction of the vehicle 1. A y-axis of the aligned coordinate system 6 is parallel to the y-axis of the vehicle coordinate system 2 and, thus, points to a left side of the vehicle 1. A z-axis of the aligned coordinate system 6 coincides with the z-axis of the vehicle coordinate system 5, is parallel to the z-axis of the vehicle coordinate system 2 and, thus, points upwards. The origin of the aligned coordinate system 6 coincides with the origin of the sensor coordinate system 5 of the respective radar sensor 4 and, thus, is located at the mounting position of the respective radar sensor 4 on the vehicle 1.

The radar sensors 4 are mounted at different positions of the vehicle 1 and are oriented in different directions, i.e. the radar sensors 4 have different mounting orientations. The mounting angles corresponding to the mounting orientations of the radar sensors 4 are yaw angles, i.e. angles around the z-axis of the vehicle coordinate system 2. The central axes of the radar sensors 4 lie, without limiting the scope of the present disclosure, in the horizontal plane of the vehicle coordinate system 2, i.e. the plane spanned by the x-axis and the v-axis of the vehicle coordinate system 2.

The radar sensors 4 are configured to detect targets by Doppler radar sensing and output radar detection data that is indicative of the targets detected by the respective radar sensor 4. The radar detection data of a radar sensor 4 indicates a radial velocity and an azimuth angle of each target detected by the respective radar sensor 4.

The present disclosure pertains to calculate the mounting orientations, i.e. the yaw angles, of the radar sensors 4 based on the radar detection data obtained from the radar sensors 4.

The approach for calculating the mounting orientations of the radar sensors 4 is based on an approach for Doppler radar ego-motion estimation. The fundamental idea behind the approach for Doppler radar ego-motion estimation is that ego-motion characteristics of an ego-vehicle, e.g. the vehicle 1, can be inferred by estimating relative velocities of static objects (i.e. targets) in a scene, assuming that the static targets in the scene can be distinguished from moving targets in the scene, given that the static targets form a biggest group following a consistent velocity profile among all detected targets in the scene.

The ego-motion estimation is based on formulating a linear system of equations that establishes a relation between measured variables (including radial velocities and azimuth angles of detected targets) and ego-motion variables (including a longitudinal velocity and a yaw rate of the vehicle 1).

In the following, a relationship between the different variables in the linear system of equations is explained on a general level under reference of FIG. 1.

A velocity of the j-th radar sensor 4 of the radar sensors 4 with respect to a ground fixed coordinate frame (e.g. a road on which the vehicle 1 is driving or an environment of the vehicle 1 in which the vehicle 1 is moving) in the sensor coordinate system 5 of the respective radar sensor 4 is denoted as $v^{SCS_j}$ and includes a component $$v_x^{SCS_j}$$

in direction of the x-axis and a component $$v_y^{SCS_j}$$

in direction of the y-axis of the corresponding sensor coordinate system 5:

$$v^{SCS_i} = \begin{bmatrix} v_x^{SCS_j} \\ v_y^{SCS_j} \end{bmatrix} \quad (1)$$

The velocity $v^{SCS_j}$ of the j-th radar sensor 4 is estimated based on the radar detection data obtained from the j-th radar sensor 4. The radar detection data obtained from the j-th radar sensor 4 is indicative of $N_j$ static targets. Hereinafter, the term "target" is used to refer to static targets, unless noted otherwise. The radar detection data obtained from the j-th radar sensor 4 associates the k-th target with a radial velocity $$v_{j,k}^D$$

and an azimuth angle $$\theta_{j,k}^D.$$

The radial velocity $$v_{j,k}^D$$

is a relative velocity between the j-th radar sensor 4 and the k-th target, i.e. a rate of change of the Euclidean distance between the j-th radar sensor 4 and the k-th target. The azimuth angle $$\theta_{j,k}^D$$

is an angle of arrival of a radar signal reflected by the k-th target, i.e. an angle between the x-axis of the sensor coordinate system 5 of the j-th radar sensor 4 and the direction of arrival of the radar signal reflected by the k-th target.

A relation between the velocity $v^{SCS_j}$ of the j-th radar sensor 4 and the targets it detects can be constructed according to the linear equation system (2):

$$\begin{bmatrix} -v_{j,1}^D \\ -v_{j,2}^D \\ \vdots \\ -v_{j,N_j}^D \end{bmatrix} = \begin{bmatrix} \cos\left(\theta_{j,1}^D\right) & \sin\left(\theta_{j,1}^D\right) \\ \cos\left(\theta_{j,2}^D\right) & \sin\left(\theta_{j,2}^D\right) \\ \vdots & \vdots \\ \cos\left(\theta_{j,N_j}^D\right) & \sin\left(\theta_{j,N_j}^D\right) \end{bmatrix} \begin{bmatrix} v_x^{SCS_j} \\ v_y^{SCS_j} \end{bmatrix} \quad (2)$$

The velocity vector $v^{SCS_j}$ of the j-th radar sensor 4 can be transformed to the aligned coordinate system 6 of the j-th radar sensor 4, which is aligned with the driving direction but located at the position of the j-th radar sensor 4, i.e. the aligned coordinate system 6 of the j-th radar sensor 4 corresponds to the sensor coordinate system 5 of the j-th radar sensor 4 rotated around its z-axis by an angle $\beta_j$ so that the x-axis and y-axis are parallel to the x-axis and v-axis of the vehicle coordinate system 2, respectively.

The velocity vector $v^{ACS_j}$ of the j-th radar sensor 4 in the aligned coordinate system 6 of the j-th radar sensor 4 includes a component $$v_x^{ACS_j}$$

in direction of the x-axis and a component $$v_y^{ACS_j}$$

in direction of the v-axis of the corresponding aligned coordinate system 6:

$$v^{ACS_j} = \begin{bmatrix} v_x^{ACS_j} \\ v_y^{ACS_j} \end{bmatrix} \quad (3)$$

Accordingly, a relation between the velocity vector $v^{ACS_j}$ of the j-th radar sensor 4 in the aligned coordinate system 6 of the j-th radar sensor 4 and the velocity vector $v^{SCS_j}$ t of the j-th radar sensor 4 in the sensor coordinate system 5 of the j-th radar sensor 4 is given in equation (4):

$$\begin{bmatrix} v_x^{SCS_j} \\ v_y^{SCS_j} \end{bmatrix} = \begin{bmatrix} \cos(\beta_j) & \sin(\beta_j) \\ -\sin(\beta_j) & \cos(\beta_j) \end{bmatrix} \begin{bmatrix} v_x^{ACS_j} \\ v_y^{ACS_j} \end{bmatrix} \quad (4)$$

Here, $\beta_j$ is the mounting angle (yaw angle) of the j-th radar sensor 4 in the platform, i.e. in the vehicle 1. Basically, in equation (4) only a rotation matrix based on the mounting angle $\beta_j$ of the j-th radar sensor 4 is applied to establish a relation between the velocity vector $v^{ACS_j}$ and the velocity vector $v^{SCS_j}$.

A velocity vector $v^{VCS}$ of the vehicle coordinate system 2 (and, thus, of the vehicle 1) includes a yaw rate $$\omega_z^{VCS}$$

of the vehicle 1 and a longitudinal velocity (forward speed)

$$v_x^{VCS}$$

of the vehicle 1:

$$v^{VCS} = \begin{bmatrix} \omega_z^{VCS} \\ v_x^{VCS} \end{bmatrix} \qquad (5)$$

For convenience, the vehicle coordinate system 2 is selected to have its origin at the center of the rear axle of the vehicle 1, without limiting the scope of the present disclosure. This allows the reasonable assumption that a velocity of the vehicle 1 along the y-axis of the vehicle coordinate system 2 is $$0 \frac{\mathrm{m}}{\mathrm{s}}$$

(Ackermann condition), meaning that there is no side drift. Notice that the j index does not appear in the $$\omega_z^{VCS}$$

and the $$v_x^{VCS}$$

because these variables are not linked to a particular radar sensor 4 but to the vehicle 1.

A velocity vector $v^{VCS}$ of the vehicle coordinate system 2 can be estimated by applying the transformation of equation (6) to $v^{ACS_j}$:

$$\begin{bmatrix} v_x^{ACS_j} \\ v_y^{ACS_j} \end{bmatrix} = \begin{bmatrix} -y_j^P & 1 \\ x_j^P & 0 \end{bmatrix} \begin{bmatrix} \omega_z^{VCS} \\ v_x^{VCS} \end{bmatrix} \qquad (6)$$

Here, $$x_j^P$$

is a component in direction of the x-axis and $$y_j^P$$

is a component in direction of the v-axis of the mounting position of the j-th radar sensor 4 in the vehicle coordinate system 2.

By combining the equations (2), (4) and (6), the final system of equations for calculating the ego-motion of the vehicle 1 based on sensor detection data obtained from the can be constructed j-th radar sensor 4 can be constructed as:

$$\begin{bmatrix} -v_{j,1}^D \\ -v_{j,2}^D \\ \vdots \\ -v_{j,N_j}^D \end{bmatrix} = \begin{bmatrix} \cos\left(\theta_{j,1}^D\right) & \sin\left(\theta_{j,1}^D\right) \\ \cos\left(\theta_{j,2}^D\right) & \sin\left(\theta_{j,2}^D\right) \\ \vdots & \vdots \\ \cos\left(\theta_{j,N_j}^D\right) & \sin\left(\theta_{j,N_j}^D\right) \end{bmatrix} \begin{bmatrix} \cos\left(\beta_j\right) & \sin\left(\beta_j\right) \\ -\sin\left(\beta_j\right) & \cos\left(\beta_j\right) \end{bmatrix} \begin{bmatrix} -y_j^P & 1 \\ x_j^P & 0 \end{bmatrix} \qquad (7)$$

-continued $$\begin{bmatrix} \omega_z^{VCS} \\ v_x^{VCS} \end{bmatrix}$$

With the definitions that $$v_j^D = \begin{bmatrix} -v_{j,1}^D \\ -v_{j,2}^D \\ \vdots \\ -v_{j,N_j}^D \end{bmatrix}, \qquad (8.1)$$

$$Q_j^D = \begin{bmatrix} \cos\left(\theta_{j,1}^D\right) & \sin\left(\theta_{j,1}^D\right) \\ \cos\left(\theta_{j,2}^D\right) & \sin\left(\theta_{j,2}^D\right) \\ \vdots & \vdots \\ \cos\left(\theta_{j,N_j}^D\right) & \sin\left(\theta_{j,N_j}^D\right) \end{bmatrix}, \qquad (8.2)$$

$$Rot(\beta_j) = \begin{bmatrix} \cos\left(\beta_j\right) & \sin\left(\beta_j\right) \\ -\sin\left(\beta_j\right) & \cos\left(\beta_j\right) \end{bmatrix}, \qquad (8.3)$$

$$S_j = \begin{bmatrix} -y_j^P & 1 \\ x_j^P & 0 \end{bmatrix} \qquad (8.4)$$

and $$R_j = Q_j^D Rot(\beta_j) S_j, \qquad (8.5)$$

equation (7) can be rewritten as:

$$v_j^D = Q_j^D Rot(\beta_j) S_j \begin{bmatrix} \omega_z^{VCS} \\ v_x^{VCS} \end{bmatrix} = R_j \begin{bmatrix} \omega_z^{VCS} \\ v_x^{VCS} \end{bmatrix} \qquad (9)$$

The equations (7) and (9) are defined for the j-th radar sensor 4 only. Since all radar sensors 4 are mounted on the same ego-platform, i.e. the vehicle 1, the individual set of equations for each radar sensor 4 can be considered together for estimating the ego-motion variables $$\left(\omega_z^{VCS} \text{ and } v_x^{VCS}\right):$$

$$\begin{bmatrix} v_1^D \\ v_1^D \\ \vdots \\ v_M^D \end{bmatrix} = \begin{bmatrix} R_1 \\ R_2 \\ \vdots \\ R_M \end{bmatrix} \begin{bmatrix} \omega_z^{VCS} \\ v_x^{VCS} \end{bmatrix} \qquad (10)$$

Here, M is the number of radar sensors 4 mounted on the vehicle 1, i.e. on the ego-vehicle. In the embodiment of FIG. 1, for example, M=5.

With the final set of equations (10), the ego-motion variables can be estimated by solving the linear regression problem of (10).

In some embodiments, the data points, i.e. the detected targets and their associated radial velocities and azimuth angles, may contain many outliers due to the presence of moving targets. Therefore, it may be advantageous to use a Random Sampling Consensus (RANSAC) algorithm for solving the linear regression problem of (10) to filter out and ignore any moving targets indicated by the radar detection data.

Based on equation (10), an ego-motion of the vehicle 1 may be estimated.

To extend the ego-motion estimation of the vehicle 1 to online calibration of the radar sensors 4, the equation (2), which already forms a linear equation system, can be solved to estimate the velocity vector $v^{SCS_j}$ of the j-th radar sensor 4. In some embodiments, this can be achieved using a RANSAC algorithm to filter out outliers in the radar detection data, e.g. moving targets.

A result of estimating the velocity vector $v^{SCS_j}$ can be used to formulate a second equation system by combining the equations (4) and (6):

$$\begin{bmatrix} \hat{v}_x^{SCS_j} \\ \hat{v}_y^{SCS_j} \end{bmatrix} = \begin{bmatrix} \cos(\beta_j) & \sin(\beta_j) \\ -\sin(\beta_j) & \cos(\beta_j) \end{bmatrix} \begin{bmatrix} -y_j^P & 1 \\ x_j^P & 0 \end{bmatrix} \begin{bmatrix} \omega_z^{YCS} \\ v_x^{YCS} \end{bmatrix} \tag{11}$$

Here, $$\hat{v}_x^{SCS_j}$$

and $$\hat{v}_y^{SCS_j}$$

are the estimated values of the components $$v_x^{SCS_j}$$

and $$v_y^{SCS_j}$$

respectively, of the vector $v^{SCS_j}$, and $$x_j^P$$

and $$y_j^P$$

are the mounting position components of the j-th radar sensor 4 in the vehicle coordinate system 2.

When treating the mounting angle $\beta_j$ of the j-th radar sensor 4 as an unknown, there are three unknowns in equation (11): the mounting angle $\beta_j$ of the j-th radar sensor 4, the yaw rare $$\omega_z^{YCS}$$

of the vehicle 1 and the longitudinal velocity $$v_x^{YCS}$$

of the vehicle 1. In this case, when considering only the j-th radar sensor 4, the equation system (11) is an underdetermined system because there are only two equations but three unknowns.

However, when considering the case of multiple radar sensors 4, i.e. of M radar sensors 4, more constraints can be included, as shown in equation (12):

$$\begin{bmatrix} \begin{bmatrix} \hat{v}_x^{SCS_1} \\ \hat{v}_y^{SCS_1} \end{bmatrix} \\ \begin{bmatrix} \hat{v}_x^{SCS_2} \\ \hat{v}_y^{SCS_2} \end{bmatrix} \\ \vdots \\ \begin{bmatrix} \hat{v}_x^{SCS_M} \\ \hat{v}_y^{SCS_M} \end{bmatrix} \end{bmatrix} = \begin{bmatrix} Rot(\beta_1)S_1 \\ Rot(\beta_2)S_2 \\ \vdots \\ Rot(\beta_M)S_M \end{bmatrix} \begin{bmatrix} \omega_z^{YCS} \\ v_x^{YCS} \end{bmatrix} \tag{12}$$

The number of equations in the equation system (12) is 2M, while the number of unknowns is M+2 (one unknown for each of the M radar sensors 4 due to its mounting angle $\beta_j$, one unknown for the yaw rate $$\omega_z^{YCS}$$

of the of the vehicle 1 and one unknown for the longitudinal velocity $$v_x^{YCS}$$

of the vehicle 1).

This means that the equation system (12) is overdetermined if M is more than 2, i.e. there are more than two radar sensors 4 mounted on the vehicle 1.

Moreover, the equation system (12) is no longer linear because trigonometric functions are applied to the mounting angles $\beta_j$.

Although the equation system (12) is non-linear, it can be solved using a non-linear least squares approach, such as the Gauss-Newton algorithm or the Marquardt-Levenberg algorithm.

By finding a solution to the non-linear equation system (12), all mounting angles $\beta_j$ of the radar sensors 4 as well as the ego-motion variables (yaw rate $$\omega_z^{YCS}$$

and forward speed $$v_x^{YCS}$$

of the vehicle 1 are estimated simultaneously, i.e. within the same estimation operation.

In some embodiments, the framework for estimating the mounting angles of the radar sensors 4 and the ego-motion of the vehicle 1 does not consider information over rime. This means that an estimation result can be obtained for each time frame independently, for example when radar sensing is performed in subsequent time frames.

In some embodiments, this allows an application of the framework for estimating the mounting angles of the radar sensors 4 and the ego-motion of the vehicle 1 for online calibration, i.e. for estimating the mounting angles $\beta_j$ of the radar sensors 4 in real-time while the vehicle 1 is driving, since the mounting angles $\beta_j$ of the radar sensors 4 can be estimated for each time frame of radar sensing.

In some embodiments, it is also possible to use past results of estimating the mounting angles $\beta_j$ of the radar sensors 4 as prior to make the calibration more stable over time. This may be achieved by using a result of a RANSAC estimation for a previous time frame as prior for a RANSAC estimation for a current time frame.

In some embodiments, estimation results are filtered by applying a Kalman filter, assuming that the mounting angles $\beta_j$ of the radar sensors 4 do not change over time.

The present disclosure is based on the idea that, in some embodiments, for a multiple radar system, the equation (12) represents an overdetermined (or, for two radar sensors 4, at least a squared) system of equations when considering the mounting angles $\beta_j$ of the radar sensors 4 and the ego-motion variables (yaw rate $$\omega_z^{VCS}$$

and forward speed $$v_x^{VCS}$$

of the vehicle 1 as unknowns. In some embodiments, this allows to estimate the mounting angles without the need of using external sensors and to obtain an estimation result in each frame. This means that, in some embodiments, the mounting angles $\beta_j$ of the radar sensors 4 can be estimated continuously, online, in real-time, and/or as a causal system.

Returning to FIG. 2, there a block diagram of a circuitry 3 according to an embodiment of the present disclosure is illustrated.

The circuitry 3 includes a sensor velocity estimation unit 7, a mounting angle and ego-motion estimation unit 8 and a Kalman filtering unit 9.

In the following, reference is made to the mathematical notation as explained above.

The circuitry 3 receives radar detection data from each of the M radar sensors 4 of the vehicle 1. The radar detection data obtained from each radar sensor 4 indicates targets detected by the respective radar sensor 4 and, for each target k detected by the j-th radar sensor 4, an associated radial velocity $$v_{j,k}^D$$

and an associated azimuth angle $$\theta_{j,k}^D$$

wherein radar detection data obtained from the j-th radar sensor 4 is indicative of $N_j$ targets.

The circuitry 3 provides the received radar detection data to the sensor velocity estimation unit 7.

The sensor velocity estimation unit 7 receives the radar detection data indicating radial velocities $$v_{j,k}^D$$

and azimuth angles $$\theta_{j,k}^D$$

associated with the targets detected by the radar sensors 4.

The sensor velocity estimation unit 7 estimates for each radar sensor 4, based on the radial velocities $$v_{j,k}^D$$

and azimuth angles $$\theta_{j,k}^D$$

indicated by the received radar detection data, values $$\hat{v}_x^{SCS_j}$$

and $$\hat{v}_y^{SCS_j}$$

of the velocity vector $v^{SCS_j}$ of the respective radar sensor 4 in the corresponding sensor coordinate system 5. The estimation of the values $$\hat{v}_x^{SCS_j}$$

and $$\hat{v}_y^{SCS_j}$$

of the velocity vectors $v^{SCS_j}$ is based on solving the equation (2) using a RANSAC regression algorithm. To improve stability of the estimation over time, the sensor velocity estimation unit 7 uses previously estimated values for the velocity vector $v^{SCS_j}$ as a prior in a current estimation.

The sensor velocity estimation unit 7 outputs the estimated values $$\hat{v}_x^{SCS_j}$$

and $$\hat{v}_y^{SCS_j}$$

for the velocity vectors $v^{SCS_j}$ of the radar sensors 4 and provides them to the mounting angle and ego-motion estimation unit 8.

The mounting angle and ego-motion estimation unit 8 receives the estimated values $$\hat{v}_x^{SCS_j}$$

and $$\hat{v}_y^{SCS_j}$$

for the velocity vectors $v^{SCS_j}$ of the radar sensors 4 from the sensor velocity estimation unit 7.

The mounting angle and ego-motion estimation unit 8 further receives mounting position information indicating the mounting positions $$x_j^P$$

and $$y_j^P$$

of the radar sensors 4 on the vehicle 1, for example from a memory (not shown in FIG. 2) of the vehicle 1. The mounting position information is predefined and is written to the memory during mounting the radar sensors 4 on the vehicle 1 or to during manufacturing the vehicle 1, for example.

The mounting angle and ego-motion estimation unit 8 estimates values of the mounting angles (yaw angles) $\beta_j$ of the radar sensors 4 and values of the ego-motion variables (including the yaw rate $$\omega_z^{VCS}$$

and the longitudinal velocity $$v_x^{VCS}$$

the vehicle 1, which are the unknowns of the equation system (12), based on the received estimated values $$\hat{v}_x^{SCS_j}$$

and $$\hat{v}_y^{SCS_j}$$

of the sensor velocity vectors $v^{SCS_j}$ and on the received mounting position information (indicating the mounting positions $$x_j^P$$

of the radar sensors 4, by solving the non-linear equation system (12) using numerical methods such as the Gauss-Newton algorithm or the Levenberg-Marquardt algorithm, for example.

The mounting angle and ego-motion estimation unit 8 outputs the estimated values of the mounting angles (yaw angles) $\beta_j$ of the radar sensors 4 and the estimated values of the ego-motion variables (including the yaw rate $$\omega_z^{VCS}$$

and the longitudinal velocity $$v_x^{VCS}$$

of the vehicle 1 and provides them to the Kalman filtering unit 9.

The Kalman filtering unit 9 receives the estimated values of the mounting angles (yaw angles) $\beta_j$ of the radar sensors 4 and the estimated values of the ego-motion variables (including the yaw rate $$\omega_z^{VCS}$$

and the longitudinal velocity $$v_x^{VCS}$$

of the vehicle 1 from the mounting angle and ego-motion estimation unit 8 and applies a Kalman filter to them for reducing noise of the estimation results, based on the assumption that the mounting angles (yaw angles) $\beta_j$ of the radar sensors 4 do not change over time.

By applying the Kalman filter, the Kalman filtering unit 9 generates filtered values $$\beta_j^F$$

of the mounting angles $\beta_j$ of the radar sensors 4, based on the received estimated values of the mounting angles $\beta_j$ of the radar sensors 4, and generates filtered values

US 12,681,144 B2

23

$$\omega_z^{YCS,F}$$

and $$v_x^{YCS,F}$$

of the ego-motion variables of the vehicle 1, based on the received estimated values of the ego-motion variables including the yaw rate $$\omega_z^{YCS}$$

and the longitudinal velocity $$v_x^{YCS}$$

respectively.

The Kalman filtering unit 9 outputs the filtered values $$\beta_j^F$$

of the mounting angles $\beta_j$ of the radar sensors 4 and the filtered values $$\omega_z^{YCS,F}$$

and $$v_x^{YCS,F}$$

of the ego-motion variables of the vehicle 1.

The circuitry 3 outputs the filtered values $$\beta_j^F$$

of the mounting angles $\beta_j$ of the radar sensors 4 and the filtered values $$\omega_z^{YCS,F}$$

and $$v_x^{YCS,F}$$

of the ego-motion variables of the vehicle 1 output by the Kalman filtering unit 9.

24

Figure 3:
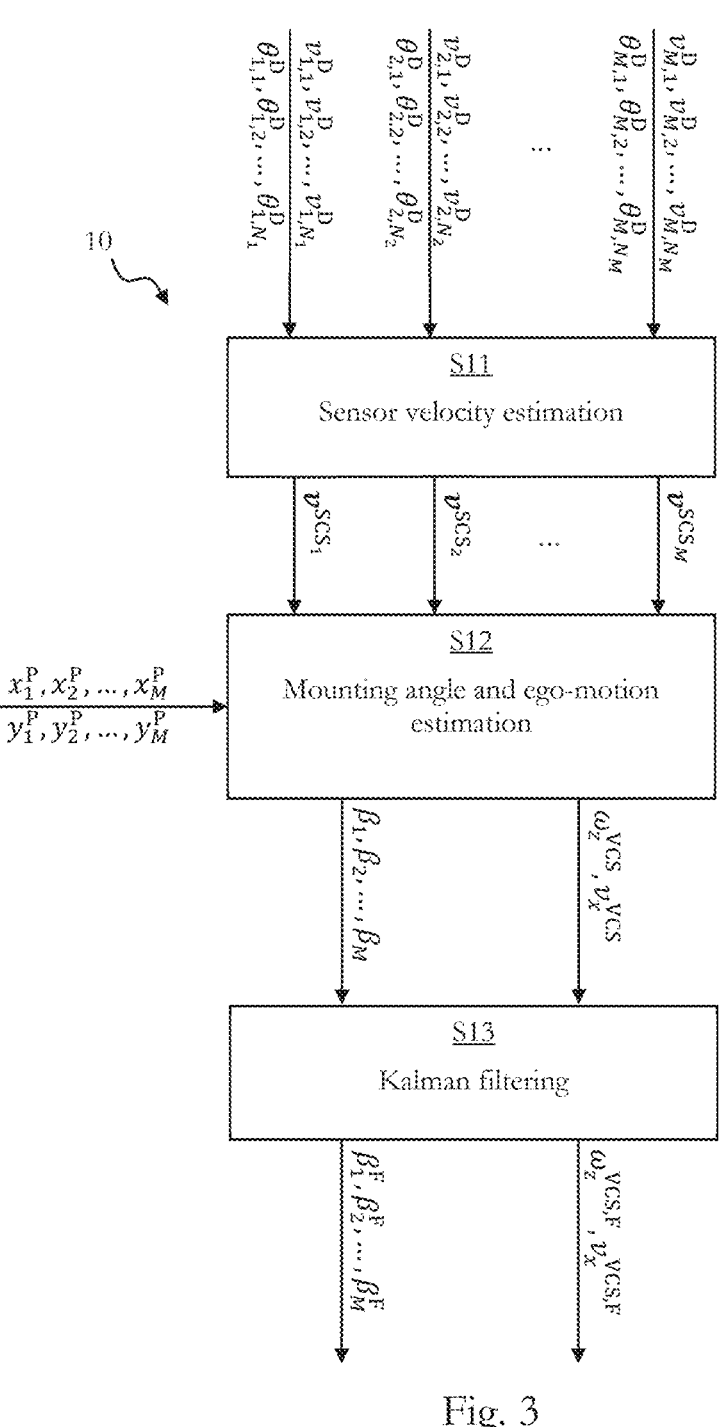
FIG. 3 is a flow diagram illustrating a method according to an embodiment of the present disclosure.

FIG. 3 is a flow diagram illustrating a method 10 for estimating the mounting angles $\beta_j$ of the radar sensors 4 mounted on the vehicle 1 according to an embodiment of the present disclosure.

At S11, a sensor velocity estimation is performed. In the sensor velocity estimation, values $$\hat{v}_x^{SCS_j}$$

and $$\hat{v}_y^{SCS_j}$$

of the velocity vectors $$v^{SCS_j}$$

of the radar sensors 4 in the respective sensor coordinate systems 5 are estimated based on radar detection data obtained from the M radar sensors 4, wherein the radar detection data obtained from the j-th radar sensor 4 indicate $N_j$ (static) targets (with $N_j$ greater than or equal to two) and, for each target k, an associated radial velocity $$v_{j,k}^D$$

and an associated azimuth angle $$\theta_{j,k}^D$$

The sensor velocity estimation is based on solving the equation (2) using a RANSAC regression algorithm. To improve stability of the estimation over time, previously estimated values for the velocity vector $v^{SCS_j}$ are used as a prior in a current estimation.

At S12, a mounting angle and ego-motion estimation is performed. In the mounting angle and ego-motion estimation, values of the mounting angles (yaw angles) $\beta_j$ of the radar sensors 4 and values of the ego-motion variables (including the raw rate $$\omega_z^{YCS}$$

and the longitudinal velocity $$v_x^{YCS}$$

of the vehicle 1, which are the unknowns of the equation system (12), are estimated based on the estimated values $$\hat{v}_x^{SCS_j}$$

25 and $$\hat{v}_y^{SCS_j}$$

of the sensor velocity vectors $v^{SCS_j}$ estimated at S11 and on mounting position information (indicating the mounting positions $$x_j^P$$

and $$y_j^P$$

) of the radar sensors 4.

The mounting position information of the radar sensors 4 is received from a memory that stores the mounting position information.

The mounting angle and ego-motion estimation is based on solving the non-linear equation system (12) using numerical methods such as the Gauss-Newton algorithm or the Levenberg-Marquardt algorithm, for example.

At S13, Kalman filtering is performed. In the Kalman filtering, a Kalman filter is applied to the estimated values of the mounting angles (yaw angles) $\beta_j$ of the radar sensors 4 and/or to the estimated values of the ego-motion variables including the yaw rare $$\omega_z^{VCS}$$

and the longitudinal velocity $$v_x^{VCS}$$

of the vehicle 1 that have been estimated at S12.

The Kalman filtering is performed to reduce noise of the estimation results from S12 and is based on the assumption that the mounting angles $\beta_j$ of the radar sensors 4 do not change over rime.

As result of the Kalman filtering, filtered values $$\beta_j^F$$

of the mounting angles $\beta_j$ of the radar sensors 4, based on the received estimated values of the mounting angles $\beta_j$ of the radar sensors 4, and/or filtered values $$\omega_z^{VCS,F}$$

and $$v_x^{VCS,F}$$

26 of the ego-motion variables of the vehicle 1, based on the received estimated values of the ego-motion variables including the yaw rate $$\omega_z^{VCS}$$

and the longitudinal velocity $$v_x^{VCS}$$

respectively, are generated.

In the following, examples of applications of the technology according to an embodiment of the present disclosure are given.

The technology according to an embodiment of the present disclosure is applicable to various products. For example, the technology according to an embodiment of the present disclosure may be implemented as a device included in a mobile body that is a mobile platform and is any of kinds of automobiles, electric vehicles, hybrid electric vehicles, motorcycles, bicycles, personal mobility vehicles, airplanes, drones, ships, robots, construction machinery, agricultural machinery (tractors), and the like.

Figure 4:
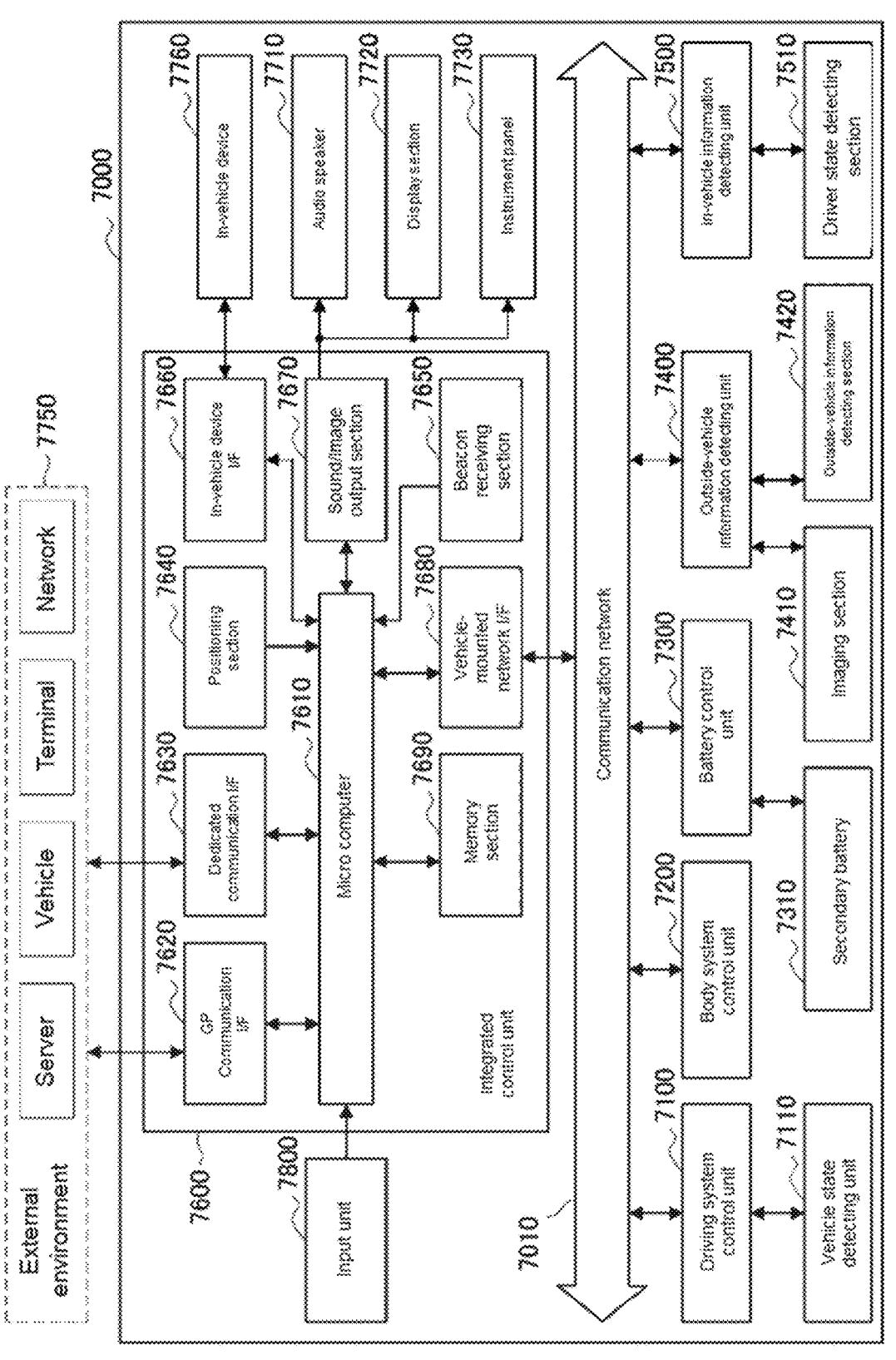
FIG. 4 is a block diagram depicting an example of schematic configuration of a vehicle control system.

FIG. 4 is a block diagram depicting an example of schematic configuration of a vehicle control system 7000 as an example of a mobile body control system to which the technology according to an embodiment of the present disclosure can be applied. For instance, the embodiments of FIG. 2 or FIG. 3 can be implemented in the vehicle control system 7000. The vehicle control system 7000 includes a plurality of electronic control units connected to each other via a communication network 7010. In the example depicted in FIG. 4, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 4 includes a microcomputer 7610, a general-purpose communication I/F; 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 720)) functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a batter output voltage, an amount of charge remaining in the batten, or the like from a battery device including the secondary batter 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 5:
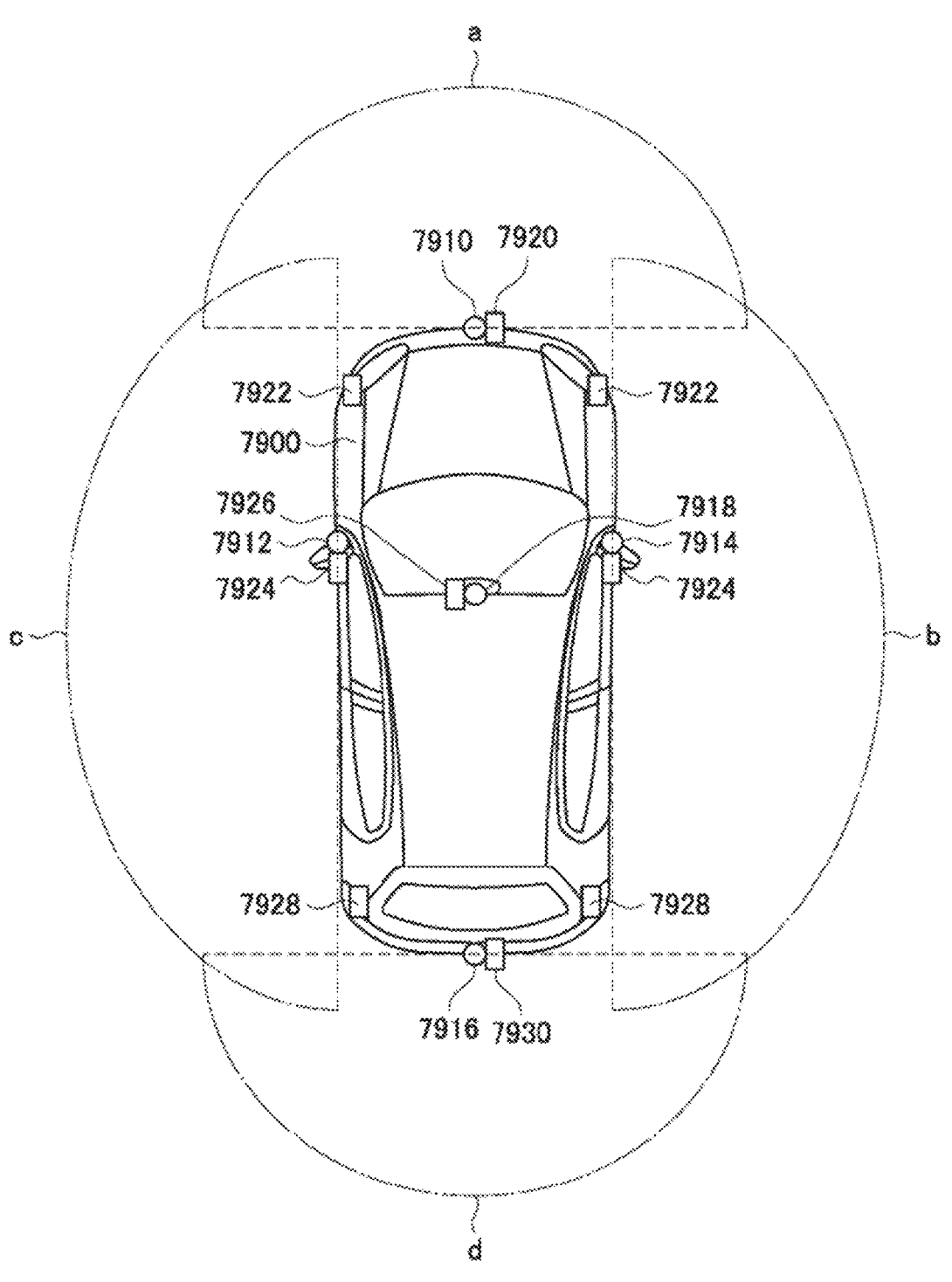
FIG. 5 is a diagram of assistance in explaining an example of installation positions of an outside-vehicle information detecting section and an imaging section.

FIG. 5 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 5 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 4, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7421) connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 700). The input section 7800 may be, for example, a camera. In that case, an occupant can input information by gesture. Alternatively, data may be input which is obtained by detecting the movement of a wearable device that an occupant wears.

Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, a application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer aid 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a borne (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the sur-roundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least One of a sound and an image to an output device capable of visually or auditorily notifying information to an occupant of the vehicle or the outside of the vehicle. In the example of FIG. 4, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 4 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 701)). Similarly, a sensor or a device connected to one of the control units may be connected to another control unit, and a plurality of control units may mutually transmit and receive detection information via the communication network 7010.

Incidentally, a computer program for realizing the functions of the information processing device 100 according to the present embodiment described with reference to FIG. 4 can be implemented in one of the control units or the like. In addition, a computer readable recording medium storing such a computer program can also be provided. The recording medium is, for example, a magnetic disk, an optical disk, a magneto-optical disk, a flash memory, or the like. In addition, the above-described computer program may be distributed via a network, for example, without the recording medium being used.

It should be recognized that the embodiments describe methods with an exemplary ordering of method steps. The specific ordering of method steps is however given for illustrative purposes only and should nor be construed as binding. Changes of the ordering of method steps may be apparent to the skilled person.

Figure 2:
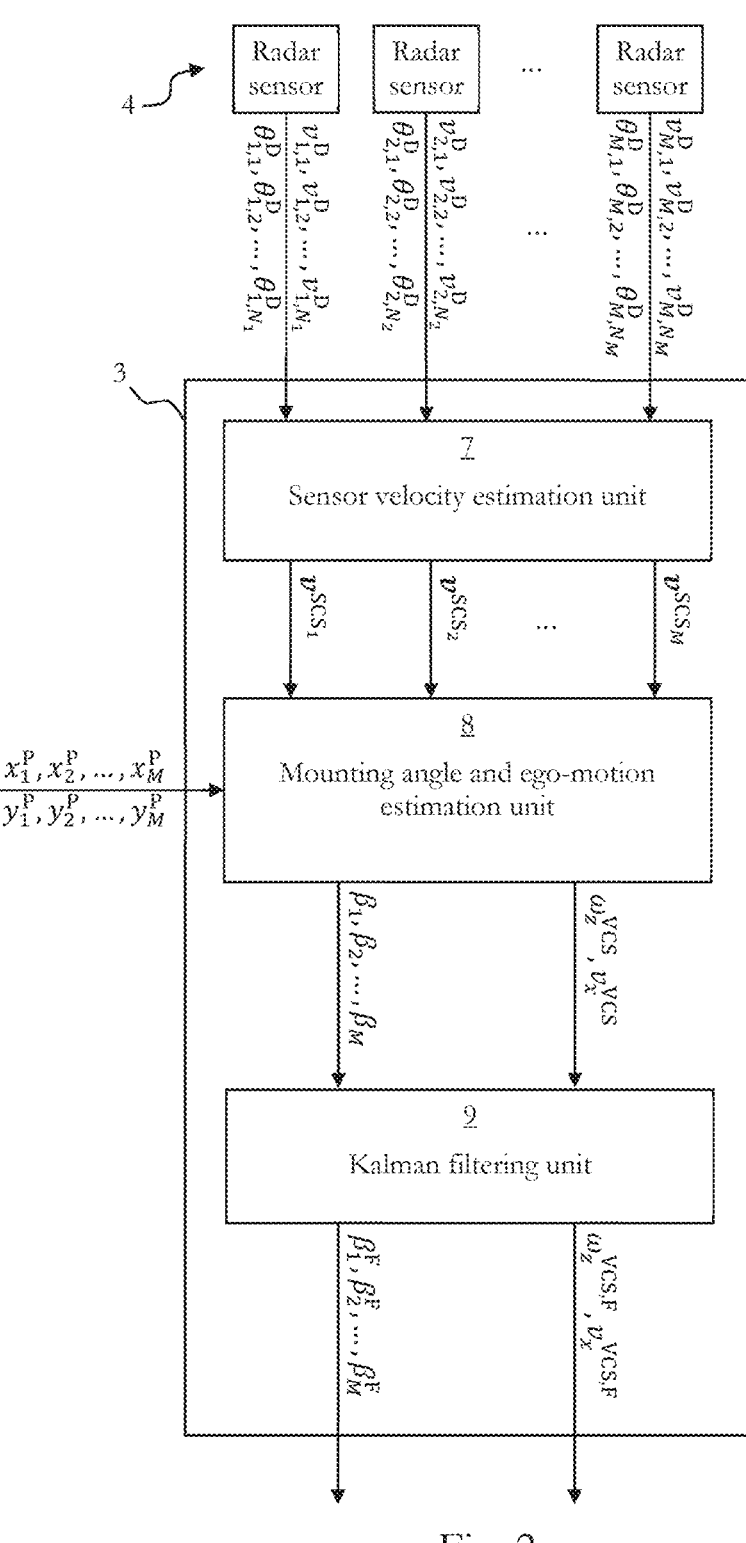
FIG. 2 is a block diagram illustrating a circuitry according to an embodiment of the present disclosure.

It should also be noted that the division of the circuitry 3 of FIG. 2 into units 7, 8 and 9 is only made for illustration purposes and that the present disclosure is not limited to any specific division of functions in specific units. For instance, at least parts of the circuitry 3 could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A circuitry for estimating a mounting angle of a radar sensor with respect to a mobile platform coordinate system, the circuitry being configured to:

estimate a first velocity of a first radar sensor, based on first radar detection data obtained from the first radar sensor, the first radar detection data being indicative of at least two targets;

estimate a second velocity of a second radar sensor, based on second radar detection data obtained from the second radar sensor, the second radar detection data being indicative of at least two targets, and estimate the mounting angle of the first radar sensor, based on the estimated first velocity, the estimated second velocity, a predefined first mounting position of the first radar sensor with respect to the mobile platform coordinate system and a predefined second mounting position of the second radar sensor with respect to the mobile platform coordinate system.

(2) The circuitry of (1), wherein the first radar detection data indicate a radial velocity and an azimuth angle of each of the at least two targets with respect to the first radar sensor, and wherein the second radar detection data indicate a radial velocity and an azimuth angle of each of the at least two targets with respect to the second radar sensor.

(3) The circuitry of (1) or (2), wherein the estimating of the mounting angle of the first radar sensor includes estimating, based on the estimated first velocity, the estimated second velocity, the predefined first mounting position and the predefined second mounting position, a longitudinal velocity of the mobile platform coordinate system and a yaw rate of the mobile platform coordinate system.

(4) the circuitry of any one of (1) to (3), wherein the estimating of the first velocity is based on a previously estimated first velocity used as prior.

(5) The circuitry of any one of (1) to (4), wherein the circuitry is further configured to filter the estimated mounting angle of the first radar sensor based on a Kalman filter for reducing noise of the estimated mounting angle of the first radar sensor.

(6) The circuitry of any one of (1) to (5), wherein the at least two targets indicated by the first radar detection data and the at least two targets indicated by the second radar detection data each represent stationary targets.

(7) The circuitry of (6), wherein the first radar detection data are further indicative of a moving target, and wherein the circuitry is further configured to distinguish the moving target from the stationary targets based on a statistical analysis of the first radar detection data.

(8) The circuitry of any one of (1) to (7), wherein the estimating of the first velocity is based on a Random Sample Consensus algorithm.

(9) The circuitry of any one of (1) to (8), wherein the estimating of the mounting angle of the first radar sensor is based on a non-linear least squares algorithm.

(10) The circuitry of any one of (1) to (9), wherein the first radar sensor and the second radar sensor include Multiple Input Multiple Output Doppler radar sensors.

(11) circuitry of any one of (1) to (10), wherein the mounting angle of the first radar sensor represents a vow angle of the first radar sensor.

(12) The circuitry of any one of (1) to (11), wherein the estimating of the mounting angle of the first radar sensor includes estimating a mounting angle of the second radar sensor with respect to the mobile platform coordinate system, based on the estimated first velocity, the estimated second velocity, the predefined first mounting position and the predefined second mounting position.

(13) A method for estimating a mounting angle of a radar sensor with respect to a mobile platform coordinate system, the method comprising:

estimating a first velocity of a first radar sensor, based on first radar detection data obtained from the first radar sensor, the first radar detection data being indicative of at least two targets;

estimating a second velocity of a second radar sensor, based on second radar detection data obtained from the second radar sensor, the second radar detection data being indicative of at least two targets, and estimating the mounting angle of the first radar sensor, based on the estimated first velocity, the estimated second velocity, a predefined first mounting position of the first radar sensor with respect to the mobile platform coordinate system and a predefined second mounting position of the second radar sensor with respect to the mobile platform coordinate system.

(14) The method of (13), wherein the first radar detection data indicate a radial velocity and an azimuth angle of each of the at least two targets with respect to the first radar sensor, and wherein the second radar detection data indicate a radial velocity and an azimuth angle of each of the at least two targets with respect to the second radar sensor.

(15) The method of (13) or (14), wherein the estimating of the mounting angle of the first radar sensor includes estimating, based on the estimated first velocity, the estimated second velocity, the predefined first mounting position and the predefined second mounting position, a longitudinal velocity of the mobile platform coordinate system and a yaw rate of the mobile platform coordinate system.

(16) The method of any one of (13) to (15), wherein the estimating of the first velocity is based on a previously estimated first velocity used as prior.

(17) The method of any one of (13) to (16), further comprising filtering, the estimated mounting angle of the first radar sensor based on a Kalman filter for reducing noise of the estimated mounting angle of the first radar sensor.

(18) The method of any one of (13) to (17), wherein the at least two targets indicated by the first radar detection data and the at least two targets indicated by the second radar detection data each represent stationary targets.

(19) The method of (18), wherein the first radar detection data are further indicative of a moving target, and wherein the method further comprises distinguishing the moving target from the stationary targets based on a statistical analysis of the first radar detection data.

(20) The method of any one of (13) to (19), wherein the estimating of the first velocity is based on a Random Sample Consensus algorithm.

(21) The method of any one of (13) to (20), wherein the estimating of the mounting angle of the first radar sensor is based on a non-linear least squares algorithm.

(22) The method of any one of (13) to (21), wherein the first radar sensor and the second radar sensor include Multiple Input Multiple Output Doppler radar sensors.

(23) The method of any one of (13) to (22), wherein the mounting angle of the first radar sensor represents a yaw angle of the first radar sensor.

(24) The method of any one of (13) to (23), wherein the estimating of the mounting angle of the first radar sensor includes estimating a mounting angle of the second radar sensor with respect to the mobile platform coordinate system, based on the estimated first velocity, the estimated second velocity, the predefined first mounting position and the predefined second mounting position.

(25) A computer program comprising instructions which, when executed by a computer, cause the computer to perform the method according to any one of (13) to (24).

(26) A non-transitory computer-readable recording medium that stores therein a computer program product, which, when executed by a processor, causes the method according to any one of (13) to (24) to be performed.

The invention claimed is:

1. A circuitry for a mobile platform having a mobile platform coordinate system, the circuitry being configured to:

estimate a first velocity of a first radar sensor based on first radar detection data obtained from the first radar sensor, the first radar detection data being indicative of at least two targets;

estimate a second velocity of a second radar sensor based on second radar detection data obtained from the second radar sensor, the second radar detection data being indicative of at least two targets;

estimate a third velocity of a third radar sensor based on third radar detection data obtained from the third radar sensor, the third radar detection data being indicative of at least two targets;

estimate each of a mounting angle of the first radar sensor, a mounting angle of the second radar sensor, a mounting angle of the third radar sensor, and an ego-motion of the mobile platform by simultaneously solving for each of the mounting angle of the first radar sensor, the mounting angle of the second radar sensor, the mounting angle of the third radar sensor, and the ego-motion of the mobile platform using an overdetermined equation system based on:

the estimated first velocity of the first radar sensor, the estimated second velocity of the second radar sensor, the estimated third velocity of the third radar sensor, a predefined first mounting position of the first radar sensor with respect to the mobile platform coordinate system, a predefined second mounting position of the second radar sensor with respect to the mobile platform coordinate system, and a predefined third mounting position of the third radar sensor with respect to the mobile platform coordinate system; and control movement of the mobile platform based upon the ego-motion.

2. The circuitry of claim 1, wherein the first radar detection data indicates a radial velocity and an azimuth angle of each of the at least two targets with respect to the first radar sensor, wherein the second radar detection data indicates a radial velocity and an azimuth angle of each of the at least two targets with respect to the second radar sensor, and wherein the third radar detection data indicates a radial velocity and an azimuth angle of each of the at least two targets with respect to the third radar sensor.

3. The circuitry of claim 1, wherein the simultaneous estimating of each of the mounting angle of the first radar sensor, the mounting angle of the second radar sensor, the mounting angle of the third radar sensor, and the ego-motion of the mobile platform includes estimating, using the over-determined equation system based on the estimated first velocity, the estimated second velocity, the estimated third velocity, the predefined first mounting position, the predefined second mounting position, and the predefined third mounting position, a longitudinal velocity of the mobile platform coordinate system and a yaw rate of the mobile platform coordinate system.

4. The circuitry of claim 1, wherein the estimating of the first velocity is based on a previously estimated first velocity used as prior.

5. The circuitry of claim 1, wherein the circuitry is further configured to filter the estimated mounting angle of the first radar sensor based on a Kalman filter for reducing noise of the estimated mounting angle of the first radar sensor.

6. The circuitry of claim 1, wherein the at least two targets indicated by the first radar detection data, the at least two targets indicated by the second radar detection data, and the at least two targets indicated by the third radar detection data each represent stationary targets.

7. The circuitry of claim 6, wherein the first radar detection data is further indicative of a moving target, and wherein the circuitry is further configured to distinguish the moving target from the stationary targets based on a statistical analysis of the first radar detection data.

8. The circuitry of claim 1, wherein the estimating of the first velocity is based on a Random Sample Consensus algorithm.

9. The circuitry of claim 1, wherein the simultaneous estimating of each of the mounting angle of the first radar sensor, the mounting angle of the second radar sensor, the mounting angle of the third radar sensor, and the ego-motion of the mobile platform is based on a non-linear least squares algorithm.

10. The circuitry of claim 1, wherein the first radar sensor, the second radar sensor, and the third radar sensor include Multiple Input Multiple Output Doppler radar sensors.

11. A method for a mobile platform having a mobile platform coordinate system, the method comprising:

estimating a first velocity of a first radar sensor based on first radar detection data obtained from the first radar sensor, the first radar detection data being indicative of at least two targets;

estimating a second velocity of a second radar sensor based on second radar detection data obtained from the second radar sensor, the second radar detection data being indicative of at least two targets;

estimating a third velocity of a third radar sensor based on third radar detection data obtained from the third radar sensor, the third radar detection data being indicative of at least two targets;

estimating each of a mounting angle of the first radar sensor, a mounting angle of the second radar sensor, a mounting angle of the third radar sensor, and an ego-motion of the mobile platform by simultaneously solving for each of the mounting angle of the first radar sensor, the mounting angle of the second radar sensor, the mounting angle of the third radar sensor, and the ego-motion of the mobile platform using an overdetermined equation system based on:

the estimated first velocity of the first radar sensor, the estimated second velocity of the second radar sensor, the estimated third velocity of the third radar sensor, a predefined first mounting position of the first radar sensor with respect to the mobile platform coordinate system, a predefined second mounting position of the second radar sensor with respect to the mobile platform coordinate system, and a predefined third mounting position of the third radar sensor with respect to the mobile platform coordinate system; and controlling movement of the mobile platform based upon the ego-motion.

12. The method of claim 11, wherein the first radar detection data indicates a radial velocity and an azimuth angle of each of the at least two targets with respect to the first radar sensor, wherein the second radar detection data indicates a radial velocity and an azimuth angle of each of the at least two targets with respect to the second radar sensor, and wherein the third radar detection data indicates a radial velocity and an azimuth angle of each of the at least two targets with respect to the third radar sensor.

13. The method of claim 11, wherein the simultaneous estimating of each of the mounting angle of the first radar sensor, the mounting angle of the second radar sensor, the mounting angle of the third radar sensor, and the ego-motion of the mobile platform includes estimating, using the over-determined equation system based on the estimated first velocity, the estimated second velocity, the estimated third velocity, the predefined first mounting position, the predefined second mounting position, and the predefined third mounting position, a longitudinal velocity of the mobile platform coordinate system and a yaw rate of the mobile platform coordinate system.

14. The method of claim 11, wherein the estimating of the first velocity is based on a previously estimated first velocity used as prior.

15. The method of claim 11, further comprising filtering the estimated mounting angle of the first radar sensor based on a Kalman filter for reducing noise of the estimated mounting angle of the first radar sensor.

16. The method of claim 11, wherein the at least two targets indicated by the first radar detection data, the at least two targets indicated by the second radar detection data, and the at least two targets indicated by the third radar detection data each represent stationary targets.

17. The method of claim 16, wherein the first radar detection data is further indicative of a moving target, and wherein the method further comprises distinguishing the moving target from the stationary targets based on a statistical analysis of the first radar detection data.

18. The method of claim 11, wherein the estimating of the first velocity is based on a Random Sample Consensus algorithm.

19. The method of claim 11, wherein the simultaneous estimating of each of the mounting angle of the first radar sensor, the mounting angle of the second radar sensor, the mounting angle of the third radar sensor, and the ego-motion of the mobile platform is based on a non-linear least squares algorithm.

20. The method of claim 11, wherein the first radar sensor, the second radar sensor, and the third radar sensor include Multiple Input Multiple Output Doppler radar sensors.

\* \* \* \* \*